United States Patent [19]

Fontaine et al.

[11] Patent Number: 4,577,183

[45] Date of Patent: Mar. 18, 1986

[54] APPARATUS FOR THE PROTECTION OF PLACES SUCH AS RESIDENCES

[75] Inventors: Guy Fontaine, Marnes-la-Coquette; Serge Achard, Marly-le-Roi, both of France

[73] Assignee: Promocab, S.A., Versailles, France

[21] Appl. No.: 357,647

[22] Filed: Mar. 12, 1982

[30] Foreign Application Priority Data

Mar. 13, 1981 [FR] France ............................ 81 05061

[51] Int. Cl.[4] ............................ G01B 13/02

[52] U.S. Cl. ............................ 340/541

[58] Field of Search ............................ 340/541, 691, 309.15, 340/309.4

[56] References Cited

U.S. PATENT DOCUMENTS 3,074,053 1/1963 McDonough et al. .
3,740,737 6/1973 Carleson .................... 340/309.15 X
3,750,132 7/1973 Natter ............................ 340/309.15
3,761,912 9/1973 Stettner et al. ............ 340/309.15 X

FOREIGN PATENT DOCUMENTS 2344899 10/1977 France .

OTHER PUBLICATIONS

Popular Mechanics, vol. 128, No. 6, Dec. 1967, New York (US) J. R. Berry "New Electronic War on Burglars" pp. 86–89.

Proceedings 1976 Carnahan Conference on Crime Countermeasures, May 1976, Lexington (US) C. M. Crawley "Progressive Entry Detection System", pp. 89–92.

*Primary Examiner*—Jerry W. Myracle
*Attorney, Agent, or Firm*—Lyon & Lyon

[57] ABSTRACT

A device for protecting premises such as residences, the device comprising at least one human presence detection sensor, a processing device and reaction mechanisms. The processing unit comprises mechanisms for modifying the operation of the reaction mechanisms each time the human presence detection sensor is activated. The reaction mechanisms may be of a conventional type comprising essentially light or acoustic devices. The device comprises mechanisms for simulating a presence inside the premises, controlled by the processing unit to simulate a presence in the occupant's absence. These simulation mechanisms may include lighting of the various rooms in the protected premises and activation of a tape recorder to play back human voices.

5 Claims, 4 Drawing Figures

APPARATUS FOR THE PROTECTION OF PLACES SUCH AS RESIDENCES

BACKGROUND OF THE INVENTION

1. Related Application

This application corresponds to French application No. 81/05061, filed Mar. 13, 1981, the entire disclosure of which is hereby incorporated by reference.

2. Field of the Invention

The object of this invention is a device for protecting premises such as, in particular, residences, and more specifically, such a device comprising at least one human presence detection sensor, a processing device and reaction mechanisms.

Conventional devices are known, wherein, when a sensor has detected a human presence, reaction mechanisms are activated, setting off light or acoustic energy, for example.

However, the disadvantage of such devices is that they cannot react to a subsequent activation of the detection sensors, as the reaction is independent of the data registered by the detection sensors and is consequently independent of the subsequent behavior of the intruder.

This invention is intended to obviate this disadvantage by providing a device for the protection of premises, which reacts continuously as a function of the intruder's behavior.

SUMMARY OF THE INVENTION

The object of this invention is therefore a device for the protection of premises such as a residence, comprising at least one human presence detection sensor, a processing unit and reaction mechanisms, characterized by the fact that the processing unit comprises mechanisms for modifying the operation of the reaction mechanisms each time the human presence detection sensor is activated.

The reaction mechanisms and the programming of their operation depends on environmental constraints, based for instance on whether the premises are in an urban or rural area, on the nature of the property to be protected, on the level of risk—that is, on the value of the goods to be protected—and on the anticipated degree of motivation of potential intruders.

However, it should be understood that the primary objective of such a device is to cause the intruder to flee, and possibly to neutralize him. This device is consequently especially well adapted to the protection of residences, as opposed to other devices which are primarily designed to protect industrial facilities, for example, where it is essential to neutralize the intruder.

The reaction mechanisms may be of a conventional type, that is, comprising essentially light or acoustic devices.

DETAILED DESCRIPTION

The device according to the invention operates on the closed-loop detection-reaction principle, which may intensify the reactions of the intruder, who may attain a state near panic and thus be induced to flee.

According to a preferred embodiment of the invention, the processing unit is programmed to increase the sensitivity level of the human presence detection sensors for a set time period after they have been set off once.

The detection sensors may in fact comprise several programmable sensitivity levels.

This is especially useful for fine-tuning the analysis of the real risk of intrusion based on initial detection.

The device according to the invention advantageously comprises mechanisms for simulating a presence inside the premises, controlled by the processing unit to simulate a presence in the occupant's absence.

These simulation mechanisms may, for example, include lighting of the various rooms in the protected premises and activation of a tape recorder to play back human voices.

According to a particular embodiment of the invention, mechanisms controlled by the processing unit, are provided to inform the occupants of the premises of an attempted break-in detected by the human presence detection sensors.

The device may comprise a single chain of sensors external to the premises however, to advantage, another chain of sensors is provided on the immediate periphery of the premises, or even inside the premises.

Thus, contacts or vibration sensors may be provided on the doors and windows of the premises. These devices are positioned on the immediate periphery of the premises and are designed to detect a break-in.

Finally, inside the premises proper, there may be installed volumetric detectors for determining whether a break-in has in fact occurred.

The sensors of the exterior chain of sensors may be of any conventional type, that is, they may either detect the energy emitted by the presence or movement of a human, such as vibration, pressure, temperature elevations, etc., or detect changes in the condition of propagation of exterior energy, such as very high frequencies or acoustic wavelengths.

A distant alarm system, controlled by the processing unit, may also be provided.

This alarm system may be connected to a telephone line, or to the low-frequency electric power supply circuit located in the premises.

Finally, mechanisms may also be provided within the premises to neutralize the intruder inside the premises, for instance, using neutralizing gas.

Preferred embodiments of the inventions shall presently be described as nonlimiting examples, reference being made to the attached schematic drawings.

Figure 1:
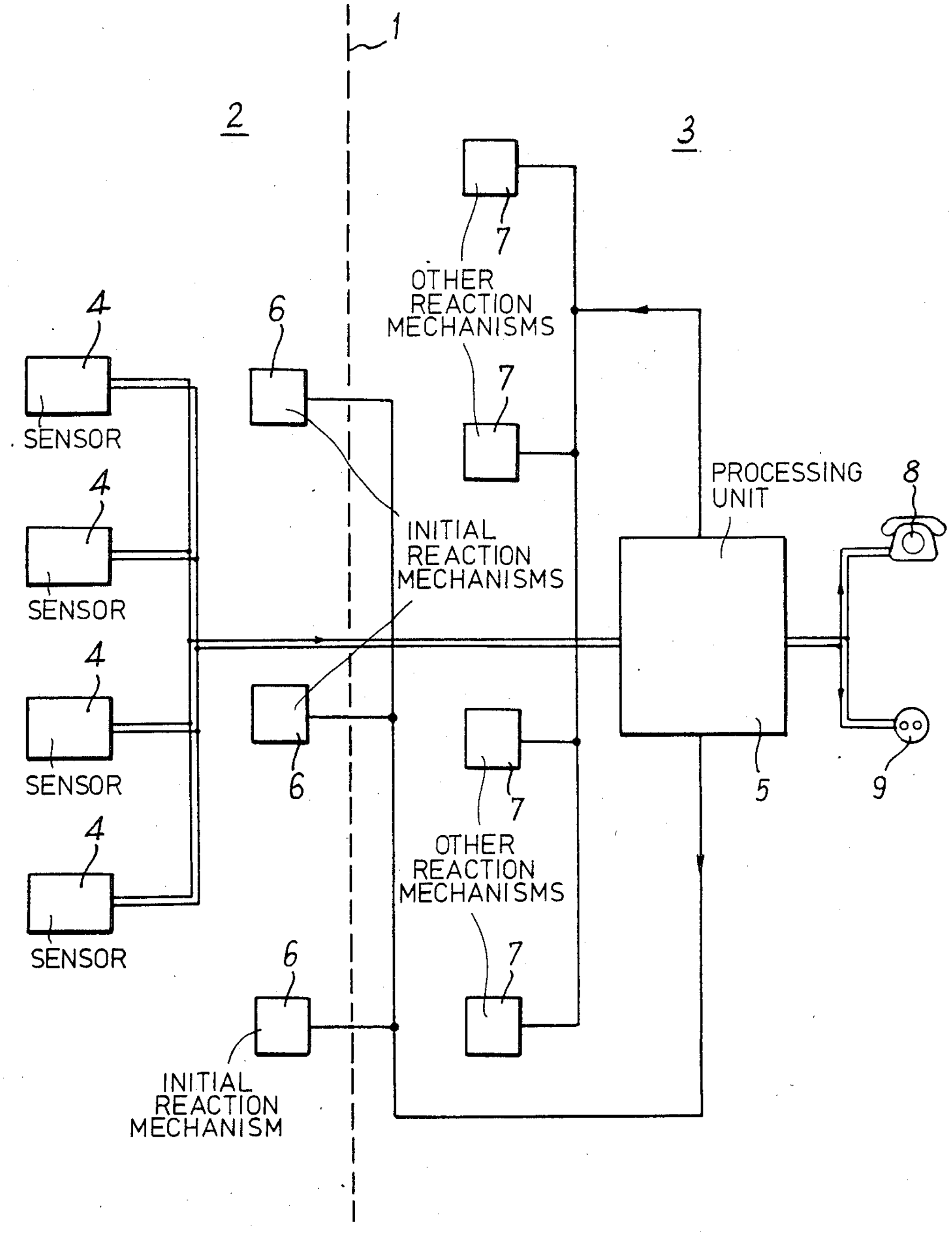
FIG. 1 is an overall view of a device according to the invention.

On FIG. 1, the broken line (1) represents the boundary of the protected premises, with the exterior located on side 2, the inside on side 3.

The device according to the invention comprises, first, a chain of sensors (4) positioned on the outside to detect any human presence.

The outputs of the sensors (4) are connected to a processing unit (5) situated inside the premises. The processing unit (5) ensures that information from the sensors (4) is received and processed, and provides for control functions and automatic testing of the device.

Initial reaction mechanisms (6) are located outside the premises and may include conventional lighting or sound signal sources.

Other reaction mechanisms (7) are positioned inside the premises, on the one hand to simulate an actual presence on the premises in the occupant's absence, and, on the other hand, to activate more powerful reactions in the case of actual entry by an intruder.

Finally, mechanisms are provided for distant transfer of alarm data, comprising, for example, a telephone (8) and a transmitter (9), connected to an electric power supply line, to provide a distant alert of a break-in, based on a given level of risk.

Figure 2:
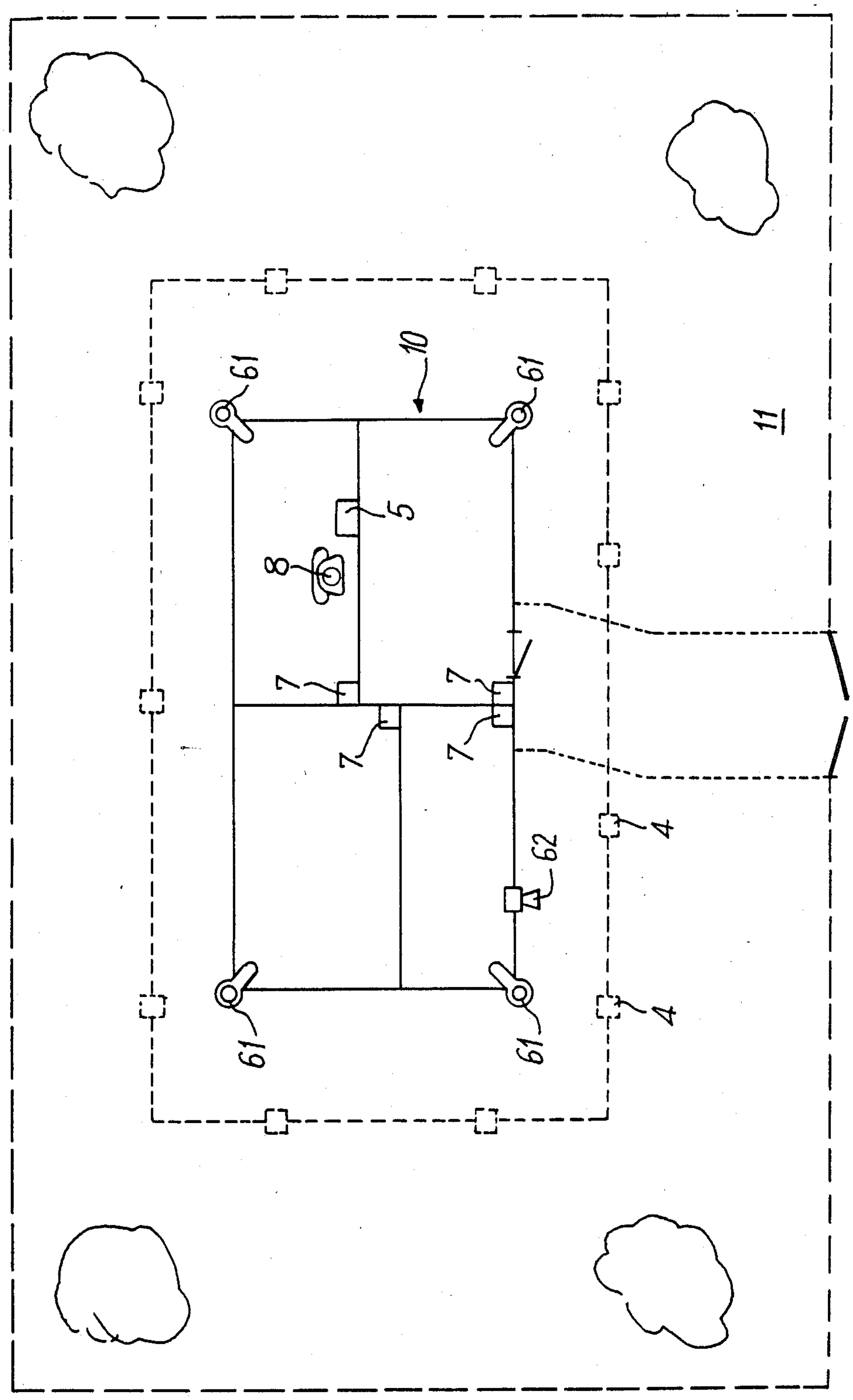
FIG. 2 illustrates an example of the installation of a device in accordance with FIG. 1.

FIG. 2 illustrates an example of installation of the device schematically represented in FIG. 1.

Here, the device is shown as protecting premises (10) situated on a lot (11).

The sensors (4) are positioned outside the premises (10), but at a close enough distance to ensure that their activation actually corresponds to a break-in attempt.

For example, in one embodiment, the sensors (4) may be units that are sensitive to vibrations caused by human movement.

The processing unit (5) is situated inside the premises (10) to assume the functions described above.

The reaction mechanisms (6) are represented here in the form of lighting (61) and a sound alarm (62). These reaction mechanisms are situated outside the premises.

One the other hand, the reaction mechanisms (7) are situated inside the premises and comprise elements to simulate a presence inside the premises, and higher-level reaction mechanisms designed to be activated when an actual presence is detected inside the premises (10).

Finally, mechanisms for distant transfer (8) of an alarm are also represented inside the premises (10), next to the processing unit (5).

When the approach of an intruder is detected by the sensors (4), the reaction mechanisms (6) are immediately activated, setting off exterior night lighting (61) or emitting a sound through the alarm system (62), night or day.

Mechanisms are provided to instantaneously increase sensor (4) sensitivity when this reaction occurs, so as to more accurately perceive the effects of the reaction mechanisms (61 and 62) on the intruder.

The processing unit (5) is programmed to activate a new reaction when the sensors (4) emit new data, for instance, to turn off the lights or to change the sound signal, thus causing a permanent change in the intruder's environment, so as to instill a feeling of worry or even panic on his part.

When the intruder has left, and if no successful break-in has occurred, the system automatically resets itself to the initial level.

If the break-in attempt is successful, distant alarms are automatically set off by mechanisms (8) and the reaction mechanisms (7) are activated.

Mechanisms (not shown) to alert the occupants of the premises (10) of a break-in attempt may also be added to the processing unit (5).

Similarly, the sensors (4) are shown to be outside the premises (10) when they are situated on a lot (11), but they may also be situated on the periphery of these premises, for instance in the case of apartments which are surrounded by public areas, human access to which cannot be controlled.

Figure 3:
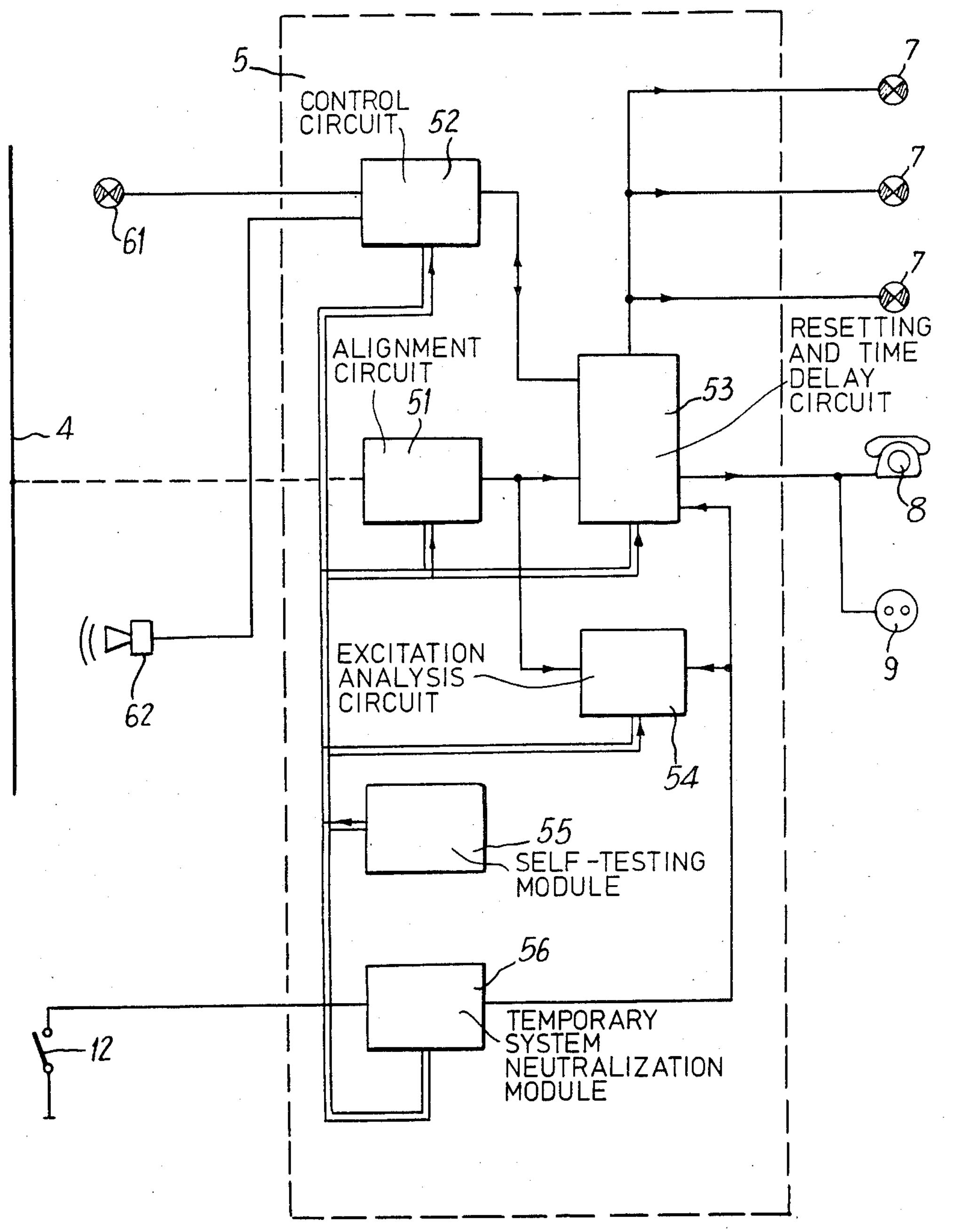
FIG. 3 is a drawing illustrating the operation of the device in FIG. 2.

FIG. 3 is a more detailed diagram of the processing unit (5).

This figure shows the inputs of the processing unit (5), originating, respectively, from the sensors (4) and from a switch (12) used to turn on the device.

The outputs comprise the exterior lighting (61) and the sound alarm (62), the secondary reaction mechanisms (7) and the distant alarm transfer mechanisms (8 and 9).

The sensors (4) are set up to provide analog or digital signals, depending on their type.

The signals emitted by the sensors (4) are aligned by an alignment circuit (51) and instantaneously activate at least one of the exterior reaction mechanisms (61 or 62).

Simultaneously, a control circuit (52) increases sensor sensitivity for a predetermined time period.

The intruder's reaction then emits a new set of data which is received by the sensors and processed by the processing unit to cause either a change in the intensity level of the reaction mechanism employed, or to activate a complementary reaction mechanism.

Consequently, it is apparent that the device operates as a closed loop for any reaction on the part of the intruder causing a change in its environment.

The processing unit (5) additionally comprises a circuit (53) for resetting and time delay of the reaction mechanisms. A circuit (54) may also be provided to analyze simultaneous excitation of several sensors, in order to eliminate the risks of false alarms.

Finally, a self-testing module (55) to inform the users of the risk of improper system operation or malfunctions, and a module (56) for temporary system neutralization when authorized persons enter or exit the premises are provided.

The distant alarm mechanisms (8 and 9) are controlled by a circuit (53) to broadcast an alarm either when there is an unusually prolonged human presence near the premises, or when a successful break-in attempt has been detected.

Figure 4:
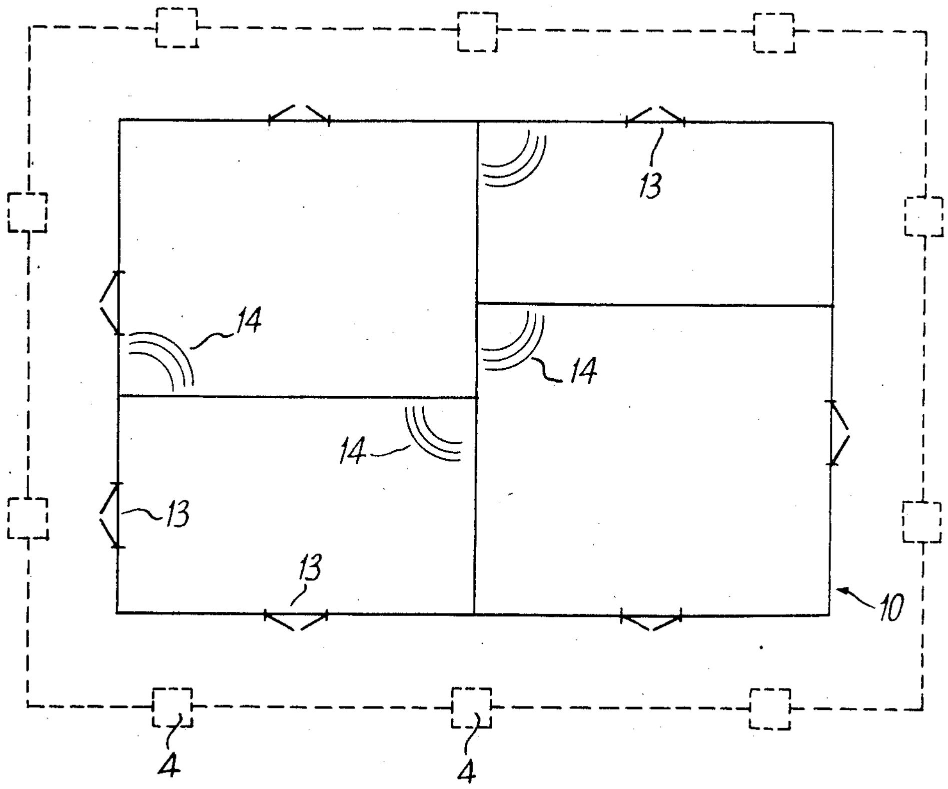
FIG. 4 illustrates a variation of the invention.

FIG. 4 represents a variation of the invention wherein other sensors are positioned inside the premises (10).

In this figure, the reference point 4 was also used for the sensors in the first chain of sensors situated outside the premises.

The additional sensors shown here are of two types. The sensors (13) are positioned on the doors and windows of the premises (10) in order to detect a successful break-in, while sensors 14 are positioned inside the rooms of premises 10 to indicate the actual presence of an intruder inside these premises.

In case of a successful break-in, these mechanism provide for activation of reaction mechanisms such as 7, causing, for instance, an alarm to be set off or possibly sealing the exits to allow for physical neutralization of the intruders.

The invention is of course not limited to the embodiments described above; the scope of the invention comprises the numerous modifications to and variations of the invention.

We claim:

1. A device for the protection of premises such as residences, comprising two chains of human presence detection sensors, a processing unit and reaction mechanisms, one of said chains of human presence detection sensors being located outside said premises, and one of said chains of human presence detection sensors being located inside said premises, said reaction mechanisms including means for simulating a presence inside the premises, controlled by the processing unit to simulate a human presence, and said processing unit including means for modifying the operation of the reaction mechanisms each time a human presence detection sensor is activated.

2. A device as set forth in claim 1, wherein said processing unit includes means for increasing, for a definite time period, the sensitivity levels of the human presence detection sensors after these have been activated once.

3. A device as set forth in claim 1 or 2, including means controlled by the processing unit to inform the occupants of the premises that an attempted break-in has been detected by the human presence detection sensors.

4. A device as set forth in claim 1 or 2, including distant alarm mechanisms, controlled by the processing unit.

5. A device as set forth in claim 1 or 2, including means for neutralizing an intruder inside the premises.

* * * * *